United States Patent
Chung et al.

(10) Patent No.: US 10,240,008 B2
(45) Date of Patent: Mar. 26, 2019

(54) THERMOPLASTIC VULCANIZATES AND METHOD OF MAKING THE SAME

(71) Applicant: ExxonMobil Chemical Patents Inc., Baytown, TX (US)

(72) Inventors: Oscar O. Chung, Houston, TX (US); Eugene R. Uhl, Massillon, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/124,925

(22) PCT Filed: Apr. 9, 2015

(86) PCT No.: PCT/US2015/025099
§ 371 (c)(1),
(2) Date: Sep. 9, 2016

(87) PCT Pub. No.: WO2015/175117
PCT Pub. Date: Nov. 19, 2015

(65) Prior Publication Data
US 2017/0022332 A1    Jan. 26, 2017

Related U.S. Application Data

(60) Provisional application No. 61/992,020, filed on May 12, 2014.

(51) Int. Cl.
| | |
|---|---|
| *C08J 3/24* | (2006.01) |
| *C08L 23/02* | (2006.01) |
| *C08L 23/16* | (2006.01) |
| *C08L 23/08* | (2006.01) |
| *C08L 23/12* | (2006.01) |

(52) U.S. Cl.
CPC .................. *C08J 3/24* (2013.01); *C08L 23/02* (2013.01); *C08L 23/083* (2013.01); *C08L 23/12* (2013.01); *C08L 23/16* (2013.01); *C08J 2323/08* (2013.01); *C08J 2323/12* (2013.01); *C08L 2205/02* (2013.01); *C08L 2205/22* (2013.01); *C08L 2207/04* (2013.01); *C08L 2207/322* (2013.01); *C08L 2312/00* (2013.01)

(58) Field of Classification Search
CPC ........ C08L 23/02; C08L 23/16; C08L 23/083; C08L 23/10; C08L 2207/322; C08L 2205/22; C08L 2207/04; C08L 2205/02; C08L 2313/00; C08J 3/24; C08J 2323/08; C08J 2323/12
See application file for complete search history.

(56) References Cited

U.S. PATENT DOCUMENTS

| | | |
|---|---|---|
| 6,399,709 B1 | 6/2002 | Moriguchi et al. |
| 6,750,292 B2 | 6/2004 | Dozeman et al. |
| 6,774,162 B1 | 8/2004 | Vortkort et al. |
| 7,737,221 B2 | 6/2010 | Wang et al. |
| 2005/0245679 A1 | 11/2005 | Ajbani et al. |
| 2006/0293454 A1 | 12/2006 | Nadella et al. |
| 2006/0293462 A1 | 12/2006 | Jacob et al. |
| 2008/0114126 A1 | 5/2008 | Blok et al. |
| 2013/0046049 A1* | 2/2013 | Ono et al. ........... C08L 23/0815 524/434 |

FOREIGN PATENT DOCUMENTS

| | | |
|---|---|---|
| EP | 0776937 | 6/1997 |
| WO | WO 2000/49086 | 8/2000 |

OTHER PUBLICATIONS

T. Hilbert et al., "*Premium Base Oil Production by the Hydroprocessing Route*", Digitalrefining, Aug. 2013, pp. 1-11.

* cited by examiner

*Primary Examiner* — Nathan M Nutter

(57) ABSTRACT

Described herein are thermoplastic vulcanizates comprising thermoplastic resin, an at least partially vulcanized rubber dispersed in the thermoplastic resin, and process oil. The process oil in the thermoplastic vulcanizate may be selected from extension oil, free oil, curative-in-oil, and/or combination thereof. At least a portion of the process oil in the thermoplastic vulcanizate is a low aromatic/sulfur content oil and has an aromatic content of less than 5 wt %, and a sulfur content of less than 0.03 wt %, based on the weight of that portion of the process oil. The thermoplastic vulcanizate exhibits improved gravimetric fogging properties.

16 Claims, No Drawings

THERMOPLASTIC VULCANIZATES AND METHOD OF MAKING THE SAME

CROSS-REFERENCE TO RELATED APPLICATIONS

This application is a National Stage Application of International Application No. PCT/US2015/025099, filed Apr. 9, 2015 which claims priority to and the benefit of U.S. Provisional Application Serial No. 61/992,020, filed May 12, 2014, the disclosure of which is incorporated herein by reference.

FIELD OF THE INVENTION

The present invention relates to thermoplastic vulcanizates, methods for making the same, and to methods for improving fogging properties of thermoplastic vulcanizates.

BACKGROUND OF THE INVENTION

Thermoplastic vulcanizates ("TPV") are vulcanized compositions that include finely dispersed crosslinked elastomer particles in a continuous thermoplastic phase. TPVs can be produced by a process called dynamic vulcanization, where the elastomeric component is selectively crosslinked during melt mixing with molten thermoplastics. TPVs have the benefits of the elastomeric properties provided by the elastomer phase and processability provided by the thermoplastic phase. TPVs can be used in the manufacture of a variety of products, and may be useful for making automotive interiors, such as instrument panels, floor consoles, and door panels.

Mineral oil, free process oil, and/or extender oils are usually contained in compositions for making TPVs. The different types of oil and the process of adding the oil can affect the properties of the TPV. For example, when TPVs are used in automotive interior applications, certain substances in the process oils can evaporate at elevated temperatures and can cause fogging on the glass or other surfaces within the automobile. Attempts to reduce fogging have been made by using high viscosity process oils and/or solid resins to produce TPVs. However, such processes add additional process complexity in the need to handle multiple oils, and the use of high viscosity oil may also undesirably increase the viscosity of the TPV.

EP Patent Application Publication No. 0776937 A2 discloses thermoplastic elastomer compositions that are prepared using hydrosilylation crosslinking, where the hydrosilylation is carried out in the presence of a process oil which is substantially free of materials having a chemical behavior of a Lewis base.

U.S. Pat. No. 6,399,709 discloses a process for producing a thermoplastic elastomer composition, which comprises the step of feeding rubber and a thermoplastic resin through independent feed throats to an extruder to perform melt kneading. The thermoplastic elastomer composition has a haze value of a glass plate of not higher than about 2%, provided that the haze value is measured with use of an apparatus according to regulations prescribed in ISO 6452 after a lapse of heating time of 20 hours at a heating temperature of 100° C.

U.S. Pat. No. 6,750,292 provides thermoplastic vulcanizates containing 5-70 parts by weight semi-crystalline polyolefin, 95-30 parts by weight rubber containing an at least partially vulcanized polymer, and oil whereby the sum of the concentration of aromatic compounds and the concentration of polar compounds in the oil are less than 4.5 wt %.

U.S. Pat. No. 6,774,162 and PCT Publication No. WO 2000/49086 provide thermoplastic vulcanizate compositions comprising (A) a thermoplastic; (B) a substantially non-cross-linked polyethylene, (C) an at least partially vulcanized rubber; and (D) a softner.

U.S. Pat. No. 7,737,221 provides a thermoplastic elastomer compositions having a Shore A hardness of less than 35 and comprising a thermoplastic polyolefin and a dynamically vulcanized elastomer having an oil/elastomer ratio of at least 2/1.

U.S. Patent Application Publication Ser. No. 2013/0046049 A1 discloses a method for producing a thermoplastic elastomer composition, the method comprising subjecting components (A), (B), (C), and (D) to dynamic thermal treatment in a melt-kneading apparatus, wherein (A) is an ethylene-alpha-olefin based copolymer rubber, (B) is a polyolefin resin, (C) is a liquid in which an alkylphenol resin has been dispersed and/or dissolved in a mineral oil, and (D) is a metal halide.

A study by T. Hilbert and G. Chitnis et al. in *Premium Base Oil Production by the Hydroprocessing Route* published on www.digitalrefining.com in August 2013 described the olatility of different compositions in lube base oil. As shown in FIG. 10 of the article, the volatility of a base oil increases in order from normal paraffin to isoparaffin to naphthene to aromatics to multi-ring naphthalene and to multi-ring aromatic, that is normal paraffin oils are the least volatile and multi-ring aromatic oils exhibit the most volatility.

While the above references have described various different TPV compositions and methods for making the same, there is still a need for TPV compositions with improved fogging properties. Thus, it would be desirable to provide TPVs that exhibit improved fogging properties without exhibiting any significant deterioration in other desired physical and mechanical properties.

SUMMARY OF THE INVENTION

Described herein are TPVs comprising thermoplastic resin, an at least partially vulcanized rubber dispersed in the thermoplastic resin, and process oil. The process oil in the thermoplastic vulcanizate may be selected from extension oil, free oil, curative-in-oil, and combinations thereof, wherein at least a portion of the process oil in the TPV is a low aromatic/sulfur content oil and has (i) an aromatic content of less than 5 wt %, or less than 3.5 wt %, or less than 1.5 wt %, based on the weight of that portion of process oil; and (ii) a sulfur content of less than 0.03 wt %, or less than 0.003 wt %, based on the weight of that portion of the process oil. The TPV exhibits a gravimetric fogging, as measured by DIN 17501B, of less than 2 milligrams, or less than 1 milligram.

In some embodiments, the low aromatic/sulfur content oil has a percentage of aromatic carbon, as determined by ASTM D2140, of less than 2%, or less than 1%, or less than 0.5%.

In some embodiments, the TPV comprises from about 5 wt % to about 85 wt % of the thermoplastic resin and from about 15 wt % to about 95 wt % of the rubber, based on the total weight of the thermoplastic resin and the rubber.

In some embodiments, the TPV has a weight ratio of process oil to rubber of from 0.5:1 to 2:1, or from 0.8:1 to 1.8:1.

Also described herein are methods for making the above described TPV compositions, comprising the steps of: (a) providing the thermoplastic resin, rubber, vulcanizing agent, and process oil, and (b) dynamically vulcanizing the rubber with the vulcanizing agent in the presence of the thermoplastic resin and the process oil. The process oil is selected from extension oil, free oil, and curative-in-oil, and combinations thereof. At least a portion of the process oil contains, based on the weight of that portion of the process oil, (i) an aromatic content of less than 5 wt %; and (ii) a sulfur content of less than 0.03 wt %.

It has been surprisingly found that the TPVs of the present invention exhibit improved gravimetric fogging without exhibiting significant deterioration of other physical and mechanical properties, such as hardness, elongation properties, and/or compression set. For example, TPVs made by the above described methods may have a gravimetric fogging, as measured by DIN 17501B, at least 10%, or at least 30% lower than a comparative TPV composition that is identical in terms of the constituents except that the process oil has an aromatic content of greater than 5 wt % and/or a sulfur content greater than 0.03 wt %.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

As used herein, when a polymer is referred to as comprising a monomer, the monomer is present in the polymer in the polymerized form of the monomer or in the derivative form of the monomer. The term "polymer" may be used to refer to homopolymers, copolymers, interpolymers, and terpolymers.

As used herein, when a polymer composition or blend is said to comprise a certain percentage, wt %, of a monomer, that percentage of monomer is based on the total amount of monomer units in all the polymer components of the composition or blend.

As used herein, a "thermoplastic vulcanizate" is broadly defined as any material that includes a dispersed, at least partially vulcanized, rubber within a thermoplastic resin. A thermoplastic vulcanizate composition can further include process oil, other ingredients, other additives, and combinations thereof.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber blended with a thermoplastic resin under conditions of shear at temperatures sufficient to plasticize the mixture. In at least one embodiment, the rubber is simultaneously crosslinked and dispersed as micro-sized particles within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

As used herein, a "partially vulcanized" rubber is one wherein at least 5 weight percent (wt %) of the crosslinkable rubber is extractable in boiling xylene, subsequent to vulcanization (preferably dynamic vulcanization), e.g., crosslinking of the rubber phase of the thermoplastic vulcanizate. For example, in a thermoplastic vulcanizate comprising a partially vulcanized rubber at least 5 wt % and less than 20 wt %, or 30 wt %, or 50 wt % of the crosslinkable rubber can be extractable from the specimen of the thermoplastic vulcanizate in boiling xylene. The percentage of extractable rubber can be determined by the technique set forth in U.S. Pat. Nos. 4,311,628; 5,100,947, and 5,157,081 and the portions of the patents referring to that technique are hereby incorporated by reference.

As used herein, a "fully vulcanized" rubber is one wherein less than 5 weight percent (wt %) of the crosslinkable rubber is extractable in boiling xylene, subsequent to vulcanization (preferably dynamic vulcanization), e.g., crosslinking of the rubber phase of the thermoplastic vulcanizate. For example, in a thermoplastic vulcanizate comprising a fully vulcanized rubber less than 5 wt %, or less than 3 wt %, or less than 2 wt %, or less than 1 wt % of the crosslinkable rubber can be extractable from the specimen of the thermoplastic vulcanizate in boiling xylene.

As used herein, a "comparative thermoplastic vulcanizate" refers to a thermoplastic vulcanizate composition that is identical with the claimed vulcanizate in terms of the constituents except that the process oil that has aromatic content of less than 5 wt % and a sulfur content less than 0.03 wt % is replaced with an oil having an aromatic content of greater than 5 wt % and/or a sulfur content greater than 0.03 wt %. Typical process oils used in comparative thermoplastic vulcanizates can be those API Group I oils, such as Sunpar™ oils commercially available from Holly Frontier Refining & Marketing LLC, Denver, Colo.

As used herein, a composition "free of" a component refers to a composition substantially devoid of the component, or comprising the component in an amount of less than about 0.5 wt %, or less than about 0.3 wt %, or less than about 0.1 wt % by weight of the total composition.

Rubber

The TPVs described herein comprise a rubber. The term "rubber(s)" and "rubber component" may be used interchangeably herein with the term "elastomer(s)". The term "rubber component" refers to any natural or synthetic polymer that is considered by persons skilled in the art to be a "rubber", which can be vulcanized or vulcanized so as to exhibit elastomeric properties.

Exemplary rubbers for use in the TPVs described herein may include unsaturated non-polar elastomers, such as monoolefin copolymer elastomers comprising non-polar elastomer copolymers of two or more monoolefins (for example, EP elastomers), which may be copolymerized with at least one polyene, usually a diene (for example, EPDM elastomers). EPDM (ethylene-propylene-diene elastomer) is a polymer of ethylene, propylene, and one or more non-conjugated diene(s). Suitable non-conjugated dienes include 5-ethylidene-2-norbornene ("ENB"); 1,4-hexadiene; 5-methylene-2-norbornene; 1,6-octadiene; 5-methyl-1,4-hexadiene; 3,7-di methyl-1,6-octadiene; 1,3-cyclopentadiene; 1,4-cyclohexadiene; dicyclopentadiene ("DCPD"); 5-vinyl-2-norbornene ("VNB"); divinyl benzene, and the like, or combinations thereof. Such elastomers have the ability to produce TPVs with a cure state generally in excess of about 95% while maintaining physical properties attributable to the crystalline or semi-crystalline polymer. EP elastomers and EPDM elastomers with intrinsic viscosity ($\eta$) measured in Decalin at 135° C. between 0.1 to 10 dl/gram are typically preferred. In a particularly preferred embodiment, the rubber component of the TPV is an EPDM and may be an EPDM rubber that comprises diene-derived units derived from ENB and/or VNB.

The rubber component of the TPV may comprise an elastomeric copolymer that contains from about 20 to about 90 mole % ethylene-derived units. Preferably, these copolymers contain from about 40 to about 85 mole %, or from about 50 to about 80 mole % ethylene-derived units. Furthermore, where the copolymers contain diene-derived units, the diene-derived units may be present in an amount from about 0.1 to about 5 mole %, or from about 0.1 to about 4 mole %, or from about 0.15 to about 2.5 mole %. The balance of the copolymer will generally be made up of units derived from alpha-olefin monomers, such as propylene-derived units. Accordingly, the copolymer may contain from about 10 to about 80 mole %, or from about 15 to about 50 mole %, or from about 20 to about 40 mole % alpha-olefin derived-units. The foregoing mole percentages are based upon the total moles of the polymer.

In some embodiments, the rubber component of the TPV may include the cyclic olefin copolymer elastomers known in the art. For example, high melting point cyclic olefin copolymer engineering resins may be used.

In some embodiments, the rubber component of the TPV may include elastomeric copolymers that have a weight average molecular weight ("Mw") that is greater than about 200,000, or greater than about 300,000, or greater than about 400,000, and may be less than about 1,000,000, or less than about 700,000. These copolymers preferably have a number average molecular weight ("Mn") that is greater than about 70,000, or from about 100,000 to about 350,000, or from about 120,000 to about 300,000, or from about 130,000 to about 250,000. Elastomers, especially those in the high end of the molecular weight range, are often oil extended in the manufacturing process and can be directly processed as such.

In some embodiments, the rubber component of the TPV may include elastomeric copolymers that have a Mooney Viscosity ML [(1+4@125° C.)] of from about 10 to about 250, or from about 30 to about 200, or from about 50 to about 200, and an MST [(5+4)@200° C.] below about 150, where the Mooney Viscosity is that of the non-oil extended elastomer.

Butyl elastomers may also be useful in the TPVs. As used herein, the term "butyl elastomer" includes copolymers of an isoolefin and a conjugated diolefin, terpolymers of an isoolefin with or without a conjugated diolefin, divinyl aromatic monomers and the halogenated derivatives of such copolymers and terpolymers. The halogenated versions thereof are particularly useful, especially brominated butyl elastomer. Another suitable copolymer that may be used is a copolymer of a C4-7 isomonoolefin and a para-alkylstyrene, and preferably halogenated derivatives thereof. The amount of halogen in the copolymer, predominantly in the para-alkylstyrene, is from 0.1 to 10 wt %. A preferred example is the brominated copolymer of isobutylene and para-methylstyrene.

The vulcanizable rubber can also be natural rubber or synthetic homo- or copolymers of at least one conjugated diene with an aromatic monomer, such as styrene, or a polar monomer such as acrylonitrile or alkyl-substituted acrylonitrile monomer(s) having from 3 to 8 carbon atoms. Those rubbers are higher in unsaturation than EPDM elastomer or butyl elastomers. Those elastomers can optionally be partially hydrogenated to increase thermal and oxidative stability. Desirably those elastomers have at least 50 wt % repeat units from at least one conjugated diene monomer having from 4 to 8 carbon atoms. Other synthetic elastomers desirably include repeat units from monomers having unsaturated carboxylic acids, unsaturated dicarboxylic acids, unsaturated anhydrides of dicarboxylic acids, and include divinylbenzene, alkylacrylates, and other monomers having from 3 to 20 carbon atoms.

The synthetic elastomer can be nonpolar or polar depending on the comonomers. Examples of synthetic elastomers include synthetic polyisoprene, polybutadiene elastomer, styrene-butadiene elastomer (SBR), butadiene-acrylonitrile elastomer, etc. Amine-functionalized, carboxy-functionalized or epoxy-functionalized synthetic elastomers may be used, and examples of these include maleated EPDM, and epoxy-functionalized natural elastomers. Non-polar elastomers are preferred; polar elastomers may be used but may require the use of one or more compatibilizers, as is well known to those skilled in the art.

Suitable elastomers for use in the TPVs described herein may also include hydrogenated styrenic triblock copolymer elastomers, exemplified by SEBS (styrene/ethylene-butylene/styrene), SEPS (styrene/ethylene-propylene/styrene), and SEEPS (styrene/ethylene-ethylene-propylene/styrene). Hydrogenated styrenic triblock copolymers may include crosslinkable styrenic blocks, which, in combination with the crosslinkable midblocks, may afford greater overall crosslinking of the vulcanized elastomer within the TPV. These elastomers may have a styrene content as low as about 10 wt % to as high as about 50 wt %, or from about 20 wt % to about 40 wt %, or from about 25 wt % to about 35 wt %. The Mw of the styrene component may be from about 7,000 to about 50,000 and the Mw of the elastomeric component may be from about 30,000 to greater than 150,000.

The TPV may comprise from about 15 wt % to about 95 wt %, or from about 30 wt % to about 90 wt %, or from about 45 wt % to about 90 wt %, or from about 50 wt % to about 90 wt %, or from about 60 wt % to about 88 wt % of the rubber. When referring to the "thermoplastic component" or "rubber component", the term "% by weight" or "wt %" is used with respect to the total of the thermoplastic resin component plus the rubber component in the TPV composition.

In some embodiments, the rubber of the TPV is advantageously completely or fully vulcanized. In other embodiments, the rubber component is partially vulcanized. In some embodiments, the rubber has a degree of vulcanization where not more than 10 wt %, or not more than 6 wt %, or not more than 5 wt %, or not more than 5 wt % is extractable in cyclohexane at 23° C.

Thermoplastic Resin

The TPV may comprise from about 5 wt % to about 85 wt %, or from about 10 wt % to about 70 wt %, or from about 10 wt % to about 55 wt %, or from about 10 wt % to about 50 wt %, or from about 12 wt % to about 40 wt % of the thermoplastic resin. When referring to the "thermoplastic component" or "rubber component", the term "% by weight" or "wt %" is used with respect to the total of the thermoplastic resin component plus the rubber component in the TPV composition.

Suitable thermoplastics used in the TPV may include crystalline or a semi-crystalline thermoplastic resins, and of such, more preferably is a thermoplastic resin that has a crystallinity of at least 10% as measured by differential scanning calorimetry. Polymers with a high glass transition temperature, e.g., non-crystalline glassy engineering resins, are also acceptable as the thermoplastic resin. Suitable thermoplastic resins generally are those with a melt temperature lower than the decomposition temperature of the elastomer. Thus, both polar and non-polar thermoplastic resins can be utilized. As used herein, reference to a thermoplastic resin may include a mixture of two or more different thermoplastic resins or a blend of one or more compatibilizers, and one or more thermoplastic resins.

Exemplary thermoplastic resins may include crystallizable polyolefins (such as homopolymers and copolymers of ethylene or propylene, and copolymers with cyclic olefins), polyimides, polyamides (nylons), polyesters, thermoplastic copolyesters or copolyamides, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, polymethymethacrylates, fluorine-containing thermoplastic resins and polyurethanes. The preferred thermoplastics are crystallizable polyolefins that are formed by polymerizing alpha-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof.

In some embodiments, the thermoplastic resin component may comprise ethylene-based homo- and copolymers having ethylene crystallinity. For example, the thermoplastic resin component may comprise high density polyethylene (HDPE), linear low density polyethylene (LLDPE), or very low density polyethylene (VLDPE, or plastomers).

In some embodiments, propylene-based homopolymers and copolymers, such as isotactic polypropylene and crystallizable copolymers of propylene and ethylene or other C4-C10 alpha-olefins, or diolefins, having isotactic propylene crystallinity, may be used. Copolymers of ethylene and propylene or ethylene or propylene with another alpha-olefin such as 1-butene, 1-hexene, 1-o ctene, 2-methyl-1-propene, 3-methyl-1-petene, 4-methyl-1-pentene, 5-methyl-1-hexene or mixtures thereof are also suitable. These will include reactor polypropylene copolymers and impact polypropylene copolymers, whether block, random, or of mixed polymer synthesis.

Polyolefin thermoplastic resins may have a Mw from about 50,000 to about 600,000, or from about 150,000 to about 500,000. Polyolefin thermoplastic resins may have a Mn from about 50,000 to about 200,000, or from about 65,000 to about 150,000. The molecular weight can typically be determined by gel permeation chromatography (GPC) using a suitable standard for the thermoplastic resin being measured. Additionally, Mn and polymer structure can be measured using Differential Refractive Index (DRI) detectors and Mw can be measured using Low Angle Light Scattering (LALLS). ASTM D 6474 provides a general description for polyolefins, see also ISO 11344 and T. Sun, 34 Macromolecules 6812 (2001) for adaptation for synthetic elastomer.

Additionally, cyclic olefin copolymers can be used as high melting point polyolefin thermoplastic resins. Preferred cyclic olefins include cyclobutene, cyclopentene, cyclooctene, norbornene, 5-methyl-norbornene, 3-methyl-norbornene, ethyl-norbornene, phenyl-norbornene, dimethyl-norbornene, diethyl-norbornene, dicyclopentadiene, tetracyclododecene, methyltetracyclododecene, and the like. Lower carbon number alpha-olefins, e.g., C3-C8, can be used as comonomers, for disruption of crystallinity and reduction of melting point. Ethylene is a particularly preferred comonomer in the cyclic olefin copolymers.

The crystalline or semi-crystalline thermoplastic resins generally have a melt temperature (Tm) that is from about 40° C. to about 350° C., or from about 60° C. to about 210° C., or from about 90° C. to about 180° C., or from about 120° C. to about 170° C. The glass transition temperature (Tg) of these thermoplastic resins may be from about −25° C. to about 10° C., or from about −5° C. to about 5° C. More generally speaking, including the semi-crystalline and glassy polar thermoplastic resins, useful thermoplastic resins will have a Tg of up to and greater than 100° C., or greater than 150° C. The characterizing temperatures are determined by DSC according to the test method of ASTM D-3418.

The thermoplastic resin may be highly crystalline isotactic or syndiotactic polypropylene. This polypropylene generally has a density of from about 0.85 to about 0.91 g/cc, with the largely isotactic polypropylene having a density of from about 0.90 to about 0.91 g/cc. In some embodiments, high and ultra-high molecular weight polypropylene that has a fractional melt flow rate may be preferred. These polypropylene resins are characterized by a melt flow rate that is from 0.2 to 3000 dg/min, and more preferably less than 1.2 dg/min, and most preferably less than or equal to 0.8 dg/min per ASTM D-1238. Melt flow rate is a measure of how easily a polymer flows under standard pressure, and is measured by using ASTM D-1238 at 230° C. and 2.16 kg load.

Vulcanizing Agent

Any vulcanizing agent that is capable of curing or cross-linking the rubber employed in preparing the TPV may be used. For example, where the rubber includes an olefinic elastomeric copolymer, the cure agent may include peroxides, phenolic resins, free radical curatives, or other curatives conventionally employed.

In preferred embodiments, the TPV is cured using a phenolic resin vulcanizing agent. The preferred phenolic resin curatives can be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In some embodiments, a blend of octyl phenol and nonylphenol-formaldehyde resins are employed. The blend may include from 25 wt % to 40 wt % octyl phenol and from 75 wt % to 60 wt % nonylphenol, more preferably, the blend includes from 30 wt % to 35 wt % octyl phenol and from 70 wt % to 65 wt % nonylphenol. In some embodiments, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

Preferred phenolic resin may have a structure according to the following general formula:

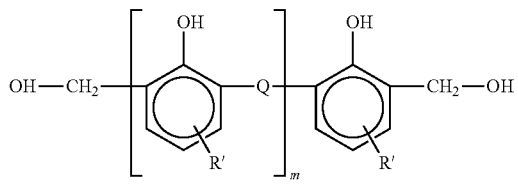

where Q is a divalent radical selected from the group consisting of —CH2- and CH2-O—CH2-; m is zero or a positive integer from 1 to 20 and R' is an alkyl group. Preferably, Q is the divalent radical —CH2-O—CH2-, m is zero or a positive integer from 1 to 10, and R' is an alkyl group having less than 20 carbon atoms. Still more preferably, m is zero or a positive integer from 1 to 5 and R' is an alkyl group having between 4 and 12 carbon atoms.

Other examples of suitable phenolic resins include those described in U.S. Pat. No. 8,207,279 and U.S. patent application Ser. No. 2013/0046049 A1.

The curative may be used in conjunction with a cure accelerator, a metal oxide, an acid scavenger, and/or polymer stabilizers. Useful cure accelerators include metal halides, such as stannous chloride, stannous chloride anhydride, stannous chloride dihydrate and ferric chloride. The cure accelerator may be used to increase the degree of vulcanization of the TPV, and in some embodiments may be added in an amount of less than 1 wt % based on the total weight of the TPV. In preferred embodiments, the cure accelerator comprises stannous chloride. In some embodiments, the cure accelerator is introduced into the vulcanization process as part of a masterbatch.

In some embodiments, metal oxides may be added to the vulcanization process. It is believed that the metal oxide can act as a scorch retarder in the vulcanization process. Useful metal oxides include zinc oxides having a mean particle diameter of about 0.05 to about 0.15 µm. Useful zinc oxide can be obtained commercially under the tradename Kadox™ 911 (Horsehead Corp.).

In some embodiments, the curative, such as a phenolic resin, is used in conjunction with an acid scavenger. The acid scavenger may be added downstream of the curative after the desired level of cure has been achieved. Useful acid scavengers include hydrotalcites. Both synthetic and natural hydrotalcites can be used. Exemplary natural hydrotalcite can be represented by the formula $Mg_6Al_2(OH)_{1-6}CO_3 \cdot 4H_2O$. Synthetic hydrotalcite compounds, which are believed to have the formula: $Mg_{4.3}Al_2(OH)_{12.6}CO_3 mH_2O$ or $Mg_{4.5}Al_2(OH)_{13}CO_{3.3} \cdot 5H_2O$, can be obtained under the tradenames DHT-4A™ or Kyowaad™ 1000 (Kyowa, Japan). Another commercial example is that available under the trade name Alcamizer™ (Kyowa).

The curative, such as a phenolic resin, may be introduced into the vulcanization process in a solution or as part of a dispersion. In preferred embodiments, the curative is introduced to the vulcanization process in an oil dispersion/solution, such as a curative-in-oil or a phenolic resin-in-oil, where the curative/resin is dispersed and/or dissolved in a process oil. The process oil used may be a mineral oil, such as an aromatic mineral oil, naphthenic mineral oil, paraffinic mineral oils, or combination thereof. In preferred embodiments, the process oil used is a low aromatic/sulfur content oil, as described herein, that has (i) an aromatic content of less than 5 wt %, or less than 3.5 wt %, or less than 1.5 wt %, based on the weight of the low aromatic/sulfur content oil, and (ii) a sulfur content of less than 0.03 wt %, or less than 0.003 wt %, based on the weight of the low aromatic/sulfur content oil.

The method of dispersing and/or dissolving the curative, such as a phenolic resin, in the process oil may be any method known in the art. For example, in some embodiments, the phenolic resin and process oil, such as a mineral oil and/or a low aromatic/sulfur content oil, may be fed together into a glass container equipped with a stirrer and heated while stirring on a water bath of 60 to 100° C. for 1 to 10 hours, as described in U.S. Patent Application Publication No. 2013/0046049 A1. For example, in other embodiments, the resin-in-oil dispersion may be made as part of the process for producing the phenolic resin, where the oil is a diluent in the manufacturing process.

In some embodiments, a free-radical vulcanizing agent, such as peroxides, for example organic peroxides, may be used. Examples of organic peroxides include, but are not limited to, di-tert-butyl peroxide, dicumyl peroxide, t-butyl-cumyl peroxide, alpha-bis(tert-butylperoxy) diisopropyl benzene, 2,5-dimethyl-2,5-di(t-butylperoxy)hexane (DBPH), 1,1-di(tert-butylperoxy)3,3,5-trimethyl cyclohexane, n-butyl-4,4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals, and mixtures thereof may be used. The peroxide may be diluted in a process oil, such as a low aromatic/sulfur content oil, and be used to produce the thermoplastic vulcanizates described herein.

The free-radical curative may be used in conjunction with a coagent. Useful coagents include high-vinyl polydiene or polydiene copolymer, triallylcyanurate, triallyl isocyanurate, triallyl phosphate, sulfur, N-phenyl bis-maleamide, divinyl benzene, trimethylol propane trimethacrylate, tetramethylene glycol diacrylate, trifunctional acrylic ester, dipentaerythritolpentacrylate, polyfunctional acrylate, retarded cyclohexane, dimethanol diacrylate ester, polyfunctional methacrylates, acrylate and methacrylate metal salts, multifunctional acrylate esters, multi-functional methacrylate esters, or a combination thereof, or oximers such as quinone dioxime.

The vulcanizing agent can be present in an amount effective to produce the desired amount of cure within the rubber phase. In certain embodiments, the vulcanizing agent is present in an amount of from 0.01 phr to 50 phr, or from 0.05 phr to 40 phr, or from 0.1 phr to 30 phr, or from 0.5 phr to 25 phr, or from 1.0 phr to 20 phr, or from 1.5 phr to 15 phr, or from 2.0 phr to 10 phr.

In embodiments where a phenolic resin is used, the phenolic resin may be employed in an amount from about 0.1 to 10 parts by weight, or from about 2 to about 6 parts by weight, or from about 3 to about 5 parts by weight, or from about 4 to about 5 parts by weight per 100 parts by weight of rubber. A complementary amount of stannous chloride may include from about 0.5 to about 2.0 parts by weight, or from about 1.0 to about 1.5 parts by weight, or from about 1.2 to about 1.3 parts by weight per 100 parts by weight of rubber. In conjunction therewith, from about 0.1 to about 6.0 parts by weight, or from about 1.0 to about 5.0 parts by weight, or from about 2.0 to about 4.0 parts by weight of zinc oxide may be employed. In one or more embodiments, the rubber employed with the phenolic curatives includes diene units deriving from 5-ethylidene-2-norbornene.

Process Oil

The process oil in the thermoplastic vulcanizate may be selected from (i) extension oil, that is oil present in an oil-extended rubber, (ii) free oil, that is oil that is added during the vulcanization process, (iii) curative-in-oil, that is oil that is used to dissolve/disperse the curative, for example, a curative-in-oil dispersion such as a phenolic resin-in-oil, and/or (iv) any combination of oils from (i), (ii), and (iii). At least a portion of the process oil in the TPV is a low aromatic/sulfur content oil and has (i) an aromatic content of less than 5 wt %, or less than 3.5 wt %, or less than 1.5 wt %, based on the weight of that portion of process oil; and (ii) a sulfur content of less than 0.03 wt %, or less than 0.003 wt %, based on the weight of that portion process oil.

The process oil used in the TPVs described herein may comprise a mineral oil. As used herein, mineral oils refer to any hydrocarbon liquid of lubricating viscosity (i.e., a kinematic viscosity at 100° C. of 1 mm$^2$/sec. or more) derived from petroleum crude oil and subjected to one or more refining and/or hydroprocessing steps (such as fractionation, hydrocracking, dewaxing, isomerization, and hydrofinishing) to purify and chemically modify the components to achieve a final set of properties. Such "refined" oils are in contrast to "synthetic" oils, which are manufactured by combining monomer units into larger molecules using catalysts, initiators, and/or heat. In the lubricant industry, refined "basestocks" are commonly divided into three categories based on their properties, as described in Table 1 below.

TABLE 1

| Category | Saturates | Sulfur | Viscosity Index |
|---|---|---|---|
| Group I | <90 wt % and/or | >0.03 wt % and | 80-119 |
| Group II | >=90 wt % and | <=0.03 wt % and | 80-119 |
| Group III | >=90 wt % and | <=0.03 wt % and | >=120 |

Thus, as described in Table 1 above, Group I oils have a sulfur content of greater than 0.03 wt %, and Group II and Group III oils have sulfur contents of less than or equal to 0.03 wt %. Examples of process oils suitable for the TPVs described herein can be those API Group II, III, IV, and V oils, such as Paralux™ and Paramount™ oils commercially available from Chevron Corp, Houston, Tex.

A common classification system for mineral oils is to identify them as either "paraffinic", "naphthenic", or "aromatic" oil based on the relative content of paraffinic, naphthenic, and aromatic moieties in the oil. As used herein, the three common classes of mineral oils are defined based on the compositions described in Table 2 below.

TABLE 2

| Mineral Oil | Typical | | | Definitions | | |
|---|---|---|---|---|---|---|
| Type | $C_P$ | $C_N$ | $C_A$ | $C_P$ | $C_N$ | $C_A$ |
| Paraffinic | 60-80% | 20-40% | 0-10% | >=60% | <40% | <20% |
| Naphthenic | 40-55% | 40-55% | 6-15% | — | >=40% | <20% |
| Aromatic | 35-55% | 10-35% | 30-40% | — | — | >=20% |

Thus, as described in Table 2 above, an aromatic oil is defined as a mineral oil having greater than or equal to 20% aromatic moieties. Typical aromatic oils contain 35-55% paraffinic moieties, 10-35% naphthenic moieties, and 30-40% aromatic moieties. Likewise with reference to Table 2, paraffinic oils are defined as mineral oils having greater than or equal to 60% paraffinic moieties, less than 40% naphthenic moieties, and less than 20% aromatic moieties. Typical paraffinic oils contain 60-80% paraffinic moieties, 20-40% naphthenic moieties, and 0-10% aromatic moieties. Illustrative paraffinic oils are described in U.S. Patent Application Publication No. 2008/0188600 A1, the contents of which is incorporated herein by reference.

The process oils can be made by any process known in the art. In some embodiments, the process oils are derived from a crude oil distillation stream. A typical refining history would include some type of dewaxing to reduce the pour point, a solvent extraction to physically remove aromatic compounds and a hydrotreating process to chemically modify aromatic structures. Both extraction and hydrotreating result in a net increase in the total concentration of saturated hydrocarbon structures and a net decrease in the total aromatic, sulfur and nitrogen-containing compound concentration. The degree of reduction in concentration of these compounds in the oil is dependent upon the type and severity of the refining employed, and the nature of the crude oil.

In some preferred embodiments, the process oils are obtained by a catalytic hydro-treating process that involves a combination of a hydrocracking and/or a severe hydrotreating step, and a hydroisomerisation step. In the hydrocracking and/or severe hydrotreating step, sulphur and nitrogen are removed from the feed as they are poisons to the downstream catalysts. Also important in the hydrocracking step is the reduction of aromatics via both saturation and boiling range reduction due to dealkylation and ring opening which in effect raises the viscosity index of the unconverted oil sent to the hydroisomerisation step. The unconverted oil from the hydrocracking step or the product from the hydrotreating step can be processed over a hydroisomerisation catalyst which will isomerise the n-paraffins while saturating the remaining aromatics. In the catalytic hydrotreating process, a final hydrofinishing step can be included to improve the oxidative stability and color of the oil. Further description of the process to produce the oil may be found in U.S. Pat. Nos. 6,261,441 B1 and 4,383,913, the contents of which are incorporated herein by reference. It is believed that oils obtained from a catalytic hydrotreating process have low Noack volatility which can further help improve fogging properties when such oils are used in the TPVs described herein.

Useful process oils may have a kinematic viscosity at 40° C. of at least 75 mm$^2$/sec, or at least 80 mm$^2$/sec, or at least 90 mm$^2$/sec, or at least 100 mm$^2$/sec, or at least 105 mm$^2$/sec. In some embodiments, the process oil may have a kinematic viscosity at 40° C. of from about 75 to about 500 mm$^2$/sec, or from about 80 to about 400 mm$^2$/sec, or from about 90 to about 350 mm$^2$/sec, or from about 100 to about 300 mm²/sec, or from about 105 to about 250 mm²/sec, where ranges from any lower limit to any upper limit are contemplated. In some embodiments, the process oil may have a viscosity at 100° C. of from 8 to 20 mm²/sec, or from 9 to 17 mm²/sec, or from 10 to 16 mm²/sec, or from 11 to 13 mm²/sec, or from 11.5 to 12.5 mm²/sec, where ranges from any lower limit to any upper limit are contemplated. The kinematic viscosities at 40° C. and at 100° C., and viscosity index can be measured in accordance with ASTM D 445. Such high viscosity process oils may be particularly useful as extension oil or free process oil.

Lower viscosity process oils that may be useful in some embodiments include process oils having a viscosity at 40° C. of less than 75 mm²/sec, or less than 60 mm²/sec, or less than 50 mm²/sec, or less than 40 mm²/sec. In some embodiments, the process oil may have a kinematic viscosity at 40° C. of from 5 to 75 mm²/sec, or from 10 to 60 mm²/sec, or from 15 to 50 mm²/sec, or from 20 to 40 mm²/sec, where ranges from any lower limit to any upper limit are contemplated. In some embodiments, the process oil may have a viscosity at 100° C. of less than 8 mm²/sec, or from 1 to 8 mm²/sec, or from 2 to 7 mm²/sec, or from 3 to 6 mm²/sec, or from 4 to 5.5 mm²/sec, where ranges from any lower limit to any upper limit are contemplated. The kinematic viscosities at 40° C. and at 100° C., and viscosity index can be measured in accordance with ASTM D 445. Such lower viscosity process oils may be particularly useful as the oil in a curative-in-oil, such as a phenolic resin-in-oil.

The process oil may be present in the TPV in an amount such that the weight ratio of the process oil to the rubber is from about 0.5:1 to about 2:1, or from about 0.8:1 to about 1.8:1.

In the TPVs described herein, at least a portion of the process oil is a low aromatic/low sulfur process oil that has (i) an aromatic content of less than about 5 wt %, or less than about 3.5 wt %, or less than about 2 wt %, or less than about 1.5 wt %, or less than about 1 wt %; and (ii) a sulfur content of less than 0.03 wt %, or less than about 0.02 wt %, or less than about 0.01 wt %, or less than about 0.005 wt %. When referring to the "aromatic content" and "sulfur content", the term "% by weight" or "wt %" is used with respect to the weight of that type of process oil in the TPV composition. The aromatic content can be determined by method ASTM D2007.

In the process oils used in the TPVs described herein, the percentage of aromatic carbon in the process oil is preferably less than 2% $C_A$, or less than 1% $C_A$, or less than 0.5% $C_A$, or may be 0% $C_A$ in some embodiments. The proportion of aromatic carbon (% $C_A$) as used herein is the proportion (percentage) of the number of aromatic carbon atoms to the number of all carbon atoms determined by the method in accordance with ASTM D2140.

The process oils used in the TPVs described herein may further comprise a synthetic process oils, such as polylinear alpha-olefins, polybranched alpha-olefins, and hydrogenated polyalphaolefins, so long as at least a portion of the process oil is a low aromatic/low sulfur process oil as described above.

As described above, the process oil in the thermoplastic vulcanizate may be (i) extension oil; (ii) free oil; (iii) curative-in-oil; and/or (iv) any combination of oils from (i), (ii), and (iii). The term "free oil" or "free process oil" herein refers to process oil that is added to the vulcanization process separately without combining with rubber, phenolic resin, or other additives. In some embodiments, the process oil in the TPV consists of extension oil, free oil, and curative-in-oil, while in other embodiments the process oil in the TPV consists only of free oil and curative-in-oil, and in other embodiments the process oil in the TPV consists only of extension oil and free oil, and in further embodiments the process oil in the TPV consists only of extension oil and curative-in-oil.

The extension oil may be present in the TPV in an amount of from 10 to 50 wt %, or from 12 to 40 wt %, or from 15 to 30 wt %, based on the weight of the TPV, where ranges from any lower limit to any upper limit are contemplated. The free process oil may be present in the TPV in an amount of from 5 to 30 wt %, or from 7 to 25 wt %, or from 10 to 20 wt %, based on the weight of the TPV, where ranges from any lower limit to any upper limit are contemplated. The oil in the curative-in-oil may be present in the TPV in an amount of from 0.2 to 5 wt %, or from 0.3 to 4 wt %, or from 0.4 to 3 wt %, or from 0.5 to 2.5 wt %, or from 0.7 to 2 wt %, based on the weight of the TPV, where ranges from any lower limit to any upper limit are contemplated.

In some embodiments, the oil content of the TPV consists essentially of, or consists only of, oil from the process oils selected from extension oil, free oil, and curative-in-oil. The extension oil may be present in the TPV in an amount of from 30 to 90 wt %, or from 35 to 80 wt %, or from 40 to 70 wt %, or from 45 to 65 wt %, based on the weight of the oil content of the TPV, where ranges from any lower limit to any upper limit are contemplated. The free oil may be present in the TPV in an amount of from 10 to 60 wt %, or from 15 to 55 wt %, or from 20 to 50 wt %, or from 25 to 45 wt %, based on the weight of the oil content of the TPV, where ranges from any lower limit to any upper limit are contemplated. The oil in the curative-in-oil may be present in the TPV in an amount of from 0.5 to 10 wt %, or from 1 to 9 wt %, or from 1.5 to 8 wt %, or from 2 to 7 wt %, or from 2.5 to 6 wt %, based on the weight of the oil content of the TPV, where ranges from any lower limit to any upper limit are contemplated.

The extension oil, the free oil, and the curative-in-oil may be the same or different oils. In some embodiments, the extension oil, free oil, and curative-in-oil are all low aromatic/low sulfur process oils as described herein. In other embodiments, only one of the extension oil, free oil, or curative-in-oil are low aromatic/low sulfur process oils while the other two types of oil are not. In further embodiments, two of the process oils selected from extension oil, free oil, or curative-in-oil are low aromatic/low sulfur process oil while the other type of oil is not.

In embodiments where the free oil comprises a low aromatic/low sulfur process oil, at least 50 wt %, or at least 60 wt %, or at least 75 wt %, or at least 80 wt %, or at least 85 wt %, or at least 90 wt %, or at least 95 wt %, or 100% of the free oil is a low aromatic/low sulfur process oil. In some embodiments, the free oil consists essentially of, or consists only of, low aromatic/low sulfur process oil.

In embodiments where the extension oil comprises a low aromatic/low sulfur process oil, at least 50 wt %, or at least 60 wt %, or at least 75 wt %, or at least 80 wt %, or at least 85 wt %, or at least 90 wt %, or at least 95 wt %, or 100% of the extension oil is a low aromatic/low sulfur process oil. In some embodiments, the extension oil consists essentially of, or consists only of, low aromatic/low sulfur process oil.

In embodiments where the oil in the curative-in-oil comprises a low aromatic/low sulfur process oil, at least 50 wt %, or at least 60 wt %, or at least 75 wt %, or at least 80 wt %, or at least 85 wt %, or at least 90 wt %, or at least 95 wt %, or 100% of the oil in the curative-in-oil is a low aromatic/low sulfur process oil. In some embodiments, the extension oil consists essentially of, or consists only of, low aromatic/low sulfur process oil.

In some embodiments, at least 30 wt %, or at least 40 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt %, or at least 100 wt %, of the process oil in the TPV is a low aromatic/low sulfur content process oil.

Additives

The TPV may further comprise one or more additives. These additives may be present in addition to, or in place of the additives which may be present in the rubber and thermoplastic resin compositions used to make the TPV. Suitable additives include, but are not limited to, plasticizers, fillers, and processing aids.

The TPV composition may also include reinforcing and non-reinforcing fillers, antioxidants, stabilizers, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

The TPV may include a polymeric processing additive. The processing additive employed is a polymeric resin that has a very high melt flow index. These polymeric resins include both linear and branched molecules that have a melt flow rate that is greater than about 500 dg/min, or greater than about 750 dg/min, or greater than about 1000 dg/min, or than about 1200 dg/min, or than about 1500 dg/min. Melt flow rate is a measure of how easily a polymer flows under standard pressure, and is measured by using ASTM D-1238 at 230° C. and 2.16 kg load. Preferred linear polymeric processing additives include polypropylene homopolymers and preferred branched polymeric processing additives include diene-modified polypropylene polymers. Thermoplastic vulcanizates that include similar processing additives are further described in U.S. Pat. No. 6,451,915.

Making of Thermoplastic Vulcanizates

Provided herein are methods for making the above described TPV compositions, comprising the steps of: (a) providing the thermoplastic resin, rubber, vulcanizing agent, and process oil; and (b) dynamically vulcanizing the rubber with the vulcanizing agent in the presence of the thermoplastic resin and the process oil. The process oil is selected from extension oil, free oil, and curative-in-oil, and combinations thereof. At least a portion of the process oil is a low aromatic/sulfur content oil as described above and contains, based on the weight of that portion of the process oil, (i) an aromatic content of less than 5 wt %; and (ii) a sulfur content of less than 0.03 wt %.

In the dynamic vulcanization process, the rubber is vulcanized under conditions of shear at a temperature at or above the melting point of the thermoplastic resin. The rubber is thus, simultaneously crosslinked and dispersed (preferably as fine particles) within the thermoplastic resin matrix, although other morphologies, such as co-continuous morphologies, may exist depending on the degree of cure, the rubber to thermoplastic viscosity ratio, the intensity of mixing, the residence time, and the temperature. The dynamic vulcanization may occur within a variety of mixing equipment including batch mixers such as Brabender mixers and continuous mixers such as multiple-screw extruders. The various pieces of equipment that can be employed include those described in "Mixing Practices Incorporating Twin-Screw Extruders," by Andersen, and "Intermeshing Twin-Screw Extruders" by Sakai, Chapters 20 and 21, MIXING AND COMPOUNDING OF POLYMERS: THEORY AND PRACTICE by Ica Manas-Zloczower and Zebev Tadmor, (New York: Hanser, 1994).

In the process for making the TPV, the process oil is preferably added in two or more locations, wherein at least the first addition of oil takes place prior to or just after the onset of vulcanization. For example, a first amount of oil of less than about 30 phr of process oil may be added to the granular rubber material before, at, or immediately after the time of feeding to the twin screw. The temperature in the extruder becomes hot enough to melt the polymeric components from the energy created by the shearing forces in the extruder, though some external heating can be added as appropriate. The temperature tends to rise as the rubber is being vulcanized, and some external cooling may also be needed, until about the time that the continuous phase of rubber with dispersed thermoplastic inverts, the rubber becomes substantially vulcanized, and begins to form dispersed cross-linked rubber particles. Free process oil is then preferably added again before, at, or within 10% total extruder length ("L") after the onset of vulcanization. More oil may be added as the rubber becomes substantially vulcanized, preferably in at least one L/d ("d" is extruder diameter) after the earlier oil injection(s), and preferably from about the completion of the rubber vulcanization to as far as the end of the extruder. In all injections into the extruder the oil may be pre-heated prior to injection.

In certain embodiments, the oil injection points into the extruder are positioned at or before one or more distributive mixing elements in the extruder, which distributive mixing element(s) is/are followed by one or more dispersive mixing elements. This arrangement particularly assists effective blending of the components for ease of processing and uniformity of the final extruded product. In some embodiments, the extruder is provided with at least one vacuum vent downstream of the oil addition locations. While not being bound by theory, it is believed some evaporates generated during the vulcanization process are expelled through the vacuum vent(s).

Additionally, it is particularly advantageous to add the curative-in-oil or molten curative through an injection port positioned in the same manner. The distributive element serves principally to effect homogeneous blending of one component with another and the dispersive mixing element serves principally to effect reduction in particle size of the dispersed phase material. In another embodiment, the extruder may have multiple barrels, with different temperature ranges for the different barrels.

In certain embodiments, certain ingredients are added after dynamic vulcanization. As those skilled in the art appreciate, dynamic vulcanization may begin by including a greater volume fraction of rubber than thermoplastic resin. As such, the thermoplastic resin may be present at the discontinuous phase when the rubber volume fraction is greater than that of the volume fraction of the thermoplastic resin. As dynamic vulcanization proceeds, the viscosity of the rubber increases and phase inversion occurs under dynamic mixing. In other words, upon phase inversion, the thermoplastic resin phase becomes the continuous phase.

In certain embodiments, other ingredients, such as additional thermoplastic resins, additional thermoplastic vulcanizates, processing additives, and/or pigments, may likewise be added after dynamic vulcanization.

The presence of additional ingredients after dynamic vulcanization can be accomplished by employing a variety of techniques. In one embodiment, the additional ingredients can be added while the thermoplastic vulcanizate remains in its molten state from the dynamic vulcanization process. For example, the additional ingredients can be added downstream of the location of dynamic vulcanization within a process that employs continuous processing equipment, such as a single or twin screw extruder. In other embodiments, the thermoplastic vulcanizate can be "worked-up" or pelletized, subsequently melted, and the additional ingredients can be added to the molten thermoplastic vulcanizate product. This latter process may be referred to as a "second pass" addition of the ingredients.

Despite the fact that the rubber may be partially or fully vulcanized, the compositions of this invention can be processed and reprocessed by conventional plastic processing techniques such as extrusion, injection, and compression molding. The rubber within these thermoplastic elastomers is usually in the form of finely-divided and well-dispersed particles of vulcanized or vulcanized rubber within a continuous thermoplastic phase or matrix, although a co-continuous morphology or a phase inversion is also possible.

Where the vulcanized rubber is in the form of finely-divided and well-dispersed particles within the thermoplastic medium, the rubber particles typically have an average diameter that is less than 50 micrometers, or less than 30 micrometers, or less than 10 micrometers, or less than 5 micrometers, or less than 1 micrometer. In some embodiments, at least 50%, or at least 60%, or at least 75% of the dispersed particles have an average diameter of less than 5 micrometers, or less than 2 micrometers, or less than 1 micrometer.

The TPVs described herein possess a gravimetric fogging, as measured by DIN 17501B, of less than 2 milligrams, or less than about 1.8 milligrams, or less than about 1.5 milligrams, or less than 1.0 milligram. Unexpectedly, it has been found the TPVs described herein that contain a low aromatic/sulfur content process oil can have a gravimetric fogging, as measured by DIN 17501B, at least 10%, or at least 20%, or at least 30%, lower than a comparative TPV that is identical in terms of the constituents except that the low aromatic/sulfur content process oil is replaced with a process oil that has an aromatic content of greater than 5 wt % and/or a sulfur content greater than 0.03 wt %.

The TPV may have a Shore A hardness of from 30 to 100, or from 40 to 95, or from 50 to 90, wherein a desirable range may comprise any combination of any lower limit with any upper limit described herein. Shore hardness can be determined based on method ASTM D-2240. By using equipment specified in DIN 53505 for the test, it will give a higher result on A scale materials ranging from 2 points at 55 A hardness level to 4 points at 87 A hardness level when compared to results obtained using instrument specified in ASTM method.

The TPV may possess a tensile strength, determined based on method ASTM D-412, of from 1 MPa to 40 MPa, or from 2 MPa to 30 MPa, or from 3 MPa to 25 MPa, wherein a desirable range may comprise any combination of any lower limit with any upper limit described herein.

The TPV may have an elongation at break, determined based on method ASTM D-412, of from 100% to 800%, or from about 200% to 750%, or from 300% to 700%, or from 350% to 650%, wherein a desirable range may comprise any combination of any lower limit with any upper limit described herein.

The TPV may have a compression set determined based on method ASTM D-395 at 22 h @ 70° C., of from 15% to 60%, or from 20% to 50%, or from 30% to 40%, wherein a desirable range may comprise any combination of any lower limit with any upper limit described herein.

The TPV may have a LCR viscosity at 1200 1/s, as measured based on method ASTM D-3835, of from 30 Pa·s to 200 Pa·s, or from 50 Pa·s to 160 Pa·s, or from 70 Pa·s to 120 Pa·s, wherein a desirable range may comprise any combination of any lower limit with any upper limit described herein.

The TPV of the present invention may be useful for making a variety of articles such as weather seals, hoses, belts, gaskets, moldings, boots, elastic fibers, and like articles. They are useful for making articles by blow molding, extrusion, injection molding, thermo-forming, elastic-welding, compression molding techniques, and by extrusion foaming. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, O-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's. Foamed articles, such as weather seal extrudates for the construction and vehicle manufacture industries, and for liquid carrying hoses, e.g., under hood automotive, are also particularly well suited.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The materials used in the examples were as follows.

V3666 was Vistalon™ 3666 EPDM, available from ExxonMobil Chemical Company. V3666 has an ethylene content of 64.0 wt % (ASTM D3900) and an ethylidene norbornene content of 4.5 wt % (ASTM D6047). In the Examples, V3666B-S was V3666 that was oil extended with 75 phr of Sunpar™ 150M oil and V3666 B-P was V3666 that was oil extended with 75 phr of Paralux™ 6001R oil. The oil extended V3666 has a typical Mooney Viscosity (ML 1+4, 125° C.) of 52 MU (ASTM D1646).

PP5341 was ExxonMobil™ PP5341E1 polypropylene homopolymer which is available from ExxonMobil Chemical Company. PP5341 has a melt mass-flow rate (MFR) (230° C.; 2.16 kg) of about 0.83 g/10 min (ASTM D1238) and a density of about 0.9 g/cc.

PP7032E2 was ExxonMobil™ PP7032E2 polypropylene impact copolymer which is available from ExxonMobil Chemical Company. PP7032E2 has a melt mass-flow rate (MFR) (230° C.; 2.16 kg) of about 4.0 g/10 min (ASTM D1238) and a density of about 0.9 g/cc.

PPF180A was Polypropylene F180A which is available from Braskem America. PPF180A is a polypropylene homopolymer that has a melt flow rate (230° C.; 2.16 kg) of about 17 g/10 min (ASTM D1238).

PPF008F was Polypropylene F008F which is available from Braskem America. PPF008F is a polypropylene homopolymer that has a melt flow rate (230° C.; 2.16 kg) of about 0.8 g/10 min (ASTM D1238).

Fina EOD 94-21 PP was a random copolymer of propylene commercially available from Fina Technology, Inc., Houston, Tex.

Ampacet 19470 PE MB and Ampacet 49974 Black MB were carbon black/polyethylene masterbatch and carbon black/polypropylene masterbatch, respectively, commercially available from Ampacet Corporation, Tarrytown, N.Y.

DC 200 Silicone Fluid was silicone liquid commercially available from Dow Coming Corporation, Midland, Mich.

VM3000 was Vistamaxx™ 3000 performance polymer available from ExxonMobil Chemical Company. VM3000 is a propylene-ethylene copolymer having an ethylene content of about 11 wt %, a density of about 0.873 g/cc (ASTM D1505), a melt index (190° C.; 2.16 kg) of about 3.6 g/10 min (ASTM D1238), and a melt mass-flow rate (MFR) (230° C.; 2.15 kg) of about 8 g/10 min.

SP-1045 was a phenolic resin commercially available from Schenectady International, Schenectady, N.Y. SP-1045 is believed to be essentially free of halogen substituents or residual halogen compounds.

HRJ 14247A RIO-S was a phenolic resin-in-oil commercially available from Schenectady International, Schenectady, N.Y. The oil used therein was Sunpar™ 115, which had a viscosity at 40° C. of about 30 mm$^2$/sec and an aromatic content of about 15 wt %, a sulfur content of about 0.05 wt % and a % $C_A$ of about 3%. Sunpar™ 115 was commercially available from HollyFrontier Refining & Marketing LLC, Denver, Colo.

HRJ 14247A RIO-P was a phenolic resin-in-oil in which the oil used was Paramount™ 2401. Paramount 2401 had a viscosity at 40° C. of about 41.5 mm$^2$/sec and an aromatic content of about 1.3 wt %, a sulfur content of about 0.001 wt %, and a % $C_A$ of about 0%, and was commercially available from Chevron Corporation, Houston, Tex.

Sunpar 150M Oil had a viscosity at 40° C. of about 107 mm$^2$/sec and an aromatic content of about 15.4 wt %, a sulfur content of 0.12 wt %. Sunpar™ 150 was commercially available from HollyFrontier Refining & Marketing LLC, Denver, Colo.

Paralux 6001R Oil had a viscosity at 40° C. of about 113.0 mm$^2$/sec and an aromatic content of about 3.1 wt %, a sulfur content of 0.001 wt %, and was commercially available from Chevron Corporation, Houston, Tex.

Examples 1 to 7 and Comparative Examples C1 to C7

Thermoplastic vulcanizates were prepared by dynamically vulcanizing rubbers within a twin-screw extruder by effecting vulcanization with a phenolic resin in the presence of stannous chloride and zinc oxide. Ingredients of the thermoplastic vulcanization compositions of Comparative Examples C1 to C7 and Examples 1 to 7 are shown in Table 3. The thermoplastic resins and granulated rubber blend and additives (silicones, carbon black masterbatches) were added at the feed throat of the twin-screw extruder. The free process oil was injected at several locations along the extruder, such that Oil #1 was injected before the cure of the rubber and the Oil #2 was injected after the cure of the rubber. Both Oil #1 and Oil #2 were added to the extruder at locations upstream of at least one vacuum vent of the extruder. The phenolic resin was and either hot-melt injected (for SP-1045) or liquid injected (for RIO) after the feed throat of the twin-screw extruder.

In Examples C6 and 6, the Hyperform HPN-68L was introduced to the extruder in a slurry form, as a slurry in oil with either Sunpar 150M Oil (Example C6) or Paralux 6001R Oil (Example 6) being used as the oil.

Certain properties of the TPV compositions of Comparative Examples C1 to C7 and Examples 1 to 7 were tested. Test methods and test results are shown in Table 4. The gravimetric fogging in Table 4 was tested with a Haake P2 DC30/K20 with the following testing conditions: hot temperature was 100° C.; cold temperature was 21° C.; exposure time was 16 hours; and specimen size was 2 mm plates. The LCR capillary viscosity in Table 4 was measured using ASTM D-3835 with a Dynisco™ capillary rheometer at 30:1 L/D at 1200 s$^{-1}$.

The extrusion surface roughness (ESR) in Table 4 was measured as follows: approximately 1 kg (2 lbs.) of the TPV to be tested was fed into a 1" or 1½" diameter extruder equipped with a 24:1 L/D screw having a 3.0 to 3.5 compression ratio. The extruder was fitted with a strip die 25.4 mm (1") wide×0.5 mm (0.019") thick×7 to 10 mm (0.24 to 0.40") land length. A breaker plate was used with the die, but no screen pack was placed in front of the breaker plate. Temperature profiles of the extruder were as follows: Zone 1=180° C. (feed zone); Zone 2=190° C. (feed zone); Zone 3=200° C. (feed zone); Zone 4=205° C. (die zone). When the zone temperatures were reached, the screw was activated. Screw speed was set to maintain an output of approximately 50 grams per minute. After flushing the extruder for 5 minutes, the extruded material was discarded and a strip approximately 30.5 cm (12") in length was extruded on a flat substrate placed directly under and touching the underside of the die. Three representative samples were collected in this manner. ESR was measured on the samples using a model EMD-04000-W5 Surfanalyzer System 4000 including a universal probe 200 mg stylus force and a Surfanalyzer probe tip type EPT-01049 (0.025 mm [0.0001"] stylus radius.

It can been seen from the test data that the TPVs in Examples 1-7 showed lower fogging as compared to the TPVs in Comparative Examples C1 to C7. The formulations of Comparative Examples C1 to C7 were substantially the same as the formulations of Examples 1 to 7, except that the oils in the oil-extended rubber and the free oils in Comparative Examples C1 to C7 were Sunpar 150M which had an aromatic content of greater than 5 wt %, whereas the oils in the oil-extended rubber and free oils in Examples 1 to 7 were Paralux™ 6001R which had an aromatic content of less than 5 wt % and a sulfur content of less than 0.03 wt %. All of the TPVs in Examples 1 to 7 exhibited at least 10% drop in fogging as compared to the corresponding Comparative Examples. Further, the TPVs made in Examples 1 and 3 to 7, achieved over 30% reduction of gravimetric fogging as compared with the TPVs in the corresponding Comparative Examples. Surprisingly, the TPVs made in Examples 4 and 5 even achieved over 50% reduction of gravimetric fogging as compared to the TPVs made Comparative Examples C4 and C5 respectively. Other properties of the TPVs made in Examples 1 to 7 are substantially the same as those in Comparative Examples C1 to C7.

TABLE 3

TPV Formulations in PHR

| | Example | | | | | | | | | | | | | |
|---|---|---|---|---|---|---|---|---|---|---|---|---|---|---|
| | C1 | 1 | C2 | 2 | C3 | 3 | C4 | 4 | C5 | 5 | C6 | 6 | C7 | 7 |
| V3666B-S | 175 | 0 | 175 | 0 | 175 | 0 | 175 | 0 | 175 | 0 | 175 | 0 | 175 | 0 |
| V3666B-P | 0 | 175 | 0 | 175 | 0 | 175 | 0 | 175 | 0 | 175 | 0 | 175 | 0 | 175 |
| Icecap K Clay | 42 | 42 | 42 | 42 | 42 | 42 | 30 | 30 | 30 | 30 | 12 | 12 | 12 | 12 |
| Stannous Chloride | 1 | 1 | 1 | 1 | 1 | 1 | 1 | 1 | 1 | 1 | 1 | 1 | 1 | 1 |
| Kadox 911 (Zinc Oxide) | 2 | 2 | 2 | 2 | 2 | 2 | 2 | 2 | 2 | 2 | 2 | 2 | 2 | 2 |
| PP7032E2 | 0 | 0 | 0 | 0 | 0 | 0 | 27.32 | 27.32 | 0 | 0 | 0 | 0 | 58.12 | 58.12 |
| PPF180A | 0 | 0 | 9.44 | 9.44 | 0 | 0 | 0 | 0 | 20 | 20 | 0 | 0 | 0 | 0 |
| PP5341 | 0 | 0 | 40.95 | 40.95 | 50.92 | 50.92 | 0 | 0 | 0 | 0 | 0 | 0 | 0 | 0 |
| PPF008F | 440.66 | 440.66 | 0 | 0 | 0 | 0 | 0 | 0 | 0 | 0 | 0 | 0 | 0 | 0 |
| Fina EOD 94-21 PP | 0 | 0 | 0 | 0 | 0 | 0 | 0 | 0 | 0 | 0 | 73 | 73 | 0 | 0 |
| VM3000 | 0 | 0 | 0 | 0 | 0 | 0 | 0 | 0 | 40 | 40 | 43 | 43 | 0 | 0 |
| Ampacet 19470 PE MB | 0 | 0 | 0 | 0 | 0 | 0 | 0 | 0 | 0 | 0 | 22.6 | 22.6 | 0 | 0 |
| Ampacet 49974 MB | 0 | 0 | 0 | 0 | 25.37 | 25.37 | 5 | 5 | 5 | 5 | 0 | 0 | 22.6 | 22.6 |
| SP-1045 | 0 | 0 | 0 | 0 | 0 | 0 | 0 | 0 | 0 | 0 | 5.26 | 5.26 | 0 | 0 |
| HRJ 14247A RIO | 15.41 | 15.41 | 10.5 | 10.5 | 12.6 | 12.6 | 8.11 | 8.11 | 10 | 10 | 0 | 0 | 11.67 | 11.67 |
| DC 200 Silicone Fluid | 0 | 0 | 0 | 0 | 0 | 0 | 0 | 0 | 17 | 17 | 0 | 0 | 0 | 0 |
| Sunpar 150M Oil #1 | 13.91 | 0 | 12.66 | 0 | 7.72 | 0 | 38.83 | 0 | 36 | 0 | 28 | 0 | 23.1 | 0 |
| Sunpar 150M Oil #2 | 42.58 | 0 | 46.46 | 0 | 43.79 | 0 | 84.9 | 0 | 85 | 0 | 46.46 | 0 | 64 | 0 |
| Paralux 6001R Oil #1 | 0 | 13.91 | 0 | 12.66 | 0 | 7.72 | 0 | 38.83 | 0 | 36 | 0 | 28 | 0 | 23.1 |
| Paralux 6001R Oil #2 | 0 | 42.58 | 0 | 46.46 | 0 | 43.79 | 0 | 84.9 | 0 | 85 | 0 | 46.46 | 0 | 64 |
| Hyperform HPN-68L | 0 | 0 | 0 | 0 | 0 | 0 | 0 | 0 | 0 | 0 | 1.06 | 1.06 | 0 | 0 |
| Slurry Sunpar 150M Oil | 0 | 0 | 0 | 0 | 0 | 0 | 0 | 0 | 0 | 0 | 9.54 | 0 | 0 | 0 |
| Slurry Paralux 6001R Oil | 0 | 0 | 0 | 0 | 0 | 0 | 0 | 0 | 0 | 0 | 0 | 9.54 | 0 | 0 |
| Total (phr) | 732.56 | 732.56 | 340.01 | 340.01 | 360.40 | 360.40 | 372.16 | 372.16 | 421.00 | 421.00 | 418.92 | 418.92 | 369.49 | 369.49 |

TABLE 4

Properties of TPVs

| | | Examples | | | | | | |
|---|---|---|---|---|---|---|---|---|
| | unit | C1 | 1 | C2 | 2 | C3 | 3 | C4 |
| Hardness (ASTM D2240 with 15 sec. delay) | Shore A | 46.9 | 47.2 | 70.5 | 71.0 | 77.9 | 78.4 | 38.0 |
| Specific Gravity (ASTM D792) | g/cm$^3$ | 0.9232 | 0.9239 | 0.9292 | 0.943 | 0.958 | 0.9698 | 0.9208 |
| Ultimate Tensile Strength (ASTM D412, 500 mm/min perpendicular to flow) | Psi (MPa) | 3570 (24.6) | 3220 (22.2) | 890 (6.1) | 860 (5.9) | 1200 (8.3) | 1150 (7.9) | 380 (2.6) |
| Ultimate Elongation (ASTM D412, 500 mm/min perpendicular to flow) | % | 690 | 590 | 430 | 400 | 420 | 420 | 350 |
| 100% Modulus (ASTM D412, 500 mm/min perpendicular to flow) | Psi (MPa) | 1810 (12.5) | 1820 (12.5) | 380 (2.6) | 390 (2.7) | 490 (3.4) | 500 (3.4) | 130 (0.9) |
| Tear Strength (ASTM D624, Die C) | lbs/in | 574 | 556 | 164 | 169 | 185 | 193 | 66 |
| LCR @ 1200/s (ASTM D3835) | Pa · s | 100.7 | 100.3 | 68.3 | 74 | 72.5 | 77.6 | 44.5 |

TABLE 4-continued

Properties of TPVs

| | | | | | | | | |
|---|---|---|---|---|---|---|---|---|
| Compression Set 22 hr@70 C. (ASTM D-395) | % | 68.0 | 54.9 | 24.7 | 26.0 | 27.6 | 28.8 | 17.5 |
| Compression Set 70 hr@125 C. (ASTM D-395) | % | / | / | 40.3 | 41.0 | 39.5 | 43.6 | 40.0 |
| Compression Set 168 hr@125 C. (ASTM D-395) | % | 88.0 | 89.0 | 48.5 | 51.6 | 51.1 | 52.5 | 43.7 |
| Gravimetric Fogging, DIN 17501B | Milligram (mg) | 2.72 | 1.72 | 1.61 | 1.40 | 1.84 | 1.21 | 1.95 |
| SAE J 1960 UV Testing, after 824 kJ | DE | / | / | 4.41 | 7.90 | 0.73 | 0.53 | 0.33 |
| Extrusion Surface Roughness | Ra, min. | 49 | 68 | 64 | 68 | 63 | 37 | 147 |

| | | Examples | | | | | | |
|---|---|---|---|---|---|---|---|---|
| | unit | 4 | C5 | 5 | C6 | 6 | C7 | 7 |
| Hardness (ASTM D2240 with 15 sec. delay) | Shore A | 38.3 | 40.3 | 40.3 | 66.2 | 66.4 | 67.4 | 67.1 |
| Specific Gravity (ASTM D792) | g/cm³ | 0.9227 | 0.9141 | 0.9235 | 0.9098 | 0.9097 | 0.9180 | 0.9177 |
| Ultimate Tensile Strength (ASTM D412, 500 mm/min perpendicular to flow) | Psi (MPa) | 390 (2.7) | 560 (3.9) | 510 (3.5) | 1370 (9.4) | 1350 (9.3) | 720 (5.0) | 650 (4.5) |
| Ultimate Elongation (ASTM D412, 500 mm/min perpendicular to flow) | % | 350 | 500 | 450 | 650 | 630 | 390 | 370 |
| 100% Modulus (ASTM D412, 500 mm/min perpendicular to flow) | Psi (MPa) | 130 (0.9) | 160 (1.1) | 160 (1.1) | 360 (2.5) | 360 (2.5) | 350 (2.4) | 340 (2.3) |
| Tear Strength (ASTM D624, Die C) | lbs/in | 66 | 90 | 95 | 189 | 192 | 128 | 130 |
| LCR @ 1200/s (ASTM D3835) | Pa · s | 51.3 | 37.3 | 37.2 | 53.3 | 57.0 | 42.2 | 47.8 |
| Compression Set 22 hr@70 C. (ASTM D-395) | % | 18.9 | 27.0 | 29.4 | 37.0 | 39.0 | 29.7 | 29.2 |
| Compression Set 70 hr@125 C. (ASTM D-395) | % | 39.8 | / | / | / | / | 52.5 | 55.3 |
| Compression Set 168 hr@125 C. (ASTM D-395) | % | 50.4 | 62.4 | 66.2 | 92.9 | 91.6 | 58.9 | 62.4 |
| Gravimetric Fogging, DIN 17501B | Milligram (mg) | 0.91 | 1.66 | 0.81 | 1.37 | 0.72 | 1.82 | 1.01 |
| SAE J 1960 UV Testing, after 824 kJ | DE | 0.11 | / | / | / | / | 25 | 21 |
| Extrusion Surface Roughness | Ra, min. | 106 | 47 | 42 | 33 | 35 | 25 | 21 |

Examples 8 to 13

The TPV compositions of Examples 8 to 13 were prepared with the same process as Examples 1 to 7. Table 5 shows the formulations of Examples 8 to 13, in which all oils in oil-extended rubbers and free process oils had an aromatic content of less than 0.3 wt % and a sulfur content of less than 0.03 wt %. The oil in the phenolic resin-in-oils in Examples 8, 10, 12 as Sunpar™ 115 oil, and the oil in Examples 9, 11, and 13 was Paramount™ 2401.

Certain properties of the TPV compositions were tested. Test methods were the same as those used in Examples 1 to 7, except that the Haake equipment for testing the gravimetric fogging was a different machine (but same model) as that used in Examples 1 to 7. Table 6 shows the test results of certain properties of the TPVs made in Examples 8 to 13.

It can be seen from the test results of Examples 9, 11, and 13 that when the process oil included in the phenolic resin-in-oil had an aromatic concentration of less than 5 wt % and a sulfur content of less than 0.03 wt %, the fogging properties of the TPVs made were less than 1 milligram, without any significant deteriorating of the other mechanical properties.

TABLE 5

TPV Formulations in phr

| | Examples | | | | | |
|---|---|---|---|---|---|---|
| | 8 | 9 | 10 | 11 | 12 | 13 |
| V3666B-P | 175 | 175 | 175 | 175 | 175 | 175 |
| Icecap K Clay | 42 | 42 | 42 | 42 | 12 | 12 |
| Stannous Chloride MB | 1.67 | 1.67 | 1.67 | 1.67 | 1.67 | 1.67 |
| Kadox 911 (Zinc Oxide) | 2 | 2 | 0 | 0 | 2 | 2 |
| PP7032E2 | 0 | 0 | 0 | 0 | 57.2 | 57.2 |
| PP5341 | 49.99 | 49.99 | 38.44 | 38.44 | 0 | 0 |
| Ampacet 49974 Black MB | 25.36 | 25.36 | 24.25 | 24.25 | 22.6 | 22.6 |
| HRJ 14247A RIO-S | 12.6 | 0 | 10.29 | 0 | 11.67 | 0 |
| HRJ 14247A RIO-P | 0 | 12.6 | 0 | 10.29 | 0 | 11.67 |
| Paralux 6001R Oil #1 | 7.72 | 7.72 | 10.82 | 10.82 | 23.1 | 23.1 |

TABLE 5-continued

TPV Formulations in phr

| | Examples | | | | | |
|---|---|---|---|---|---|---|
| | 8 | 9 | 10 | 11 | 12 | 13 |
| Paralux 6001R Oil #2 | 43.78 | 43.79 | 43.3 | 43.3 | 64 | 64 |
| Total (Phr) | 360.12 | 360.13 | 345.77 | 345.77 | 369.24 | 369.24 |

TABLE 6

Properties of TPVs

| | Examples | | | | | |
|---|---|---|---|---|---|---|
| | 8 | 9 | 10 | 11 | 12 | 13 |
| Hardness, Shore A (ASTM D2240, 15 sec. delay) | 77.5 | 77.7 | 72.4 | 70.8 | 68.0 | 68.2 |
| 100% Modulus, MPa (ASTM D412, 500 mm/min perpendicular to flow) | 3.86 | 3.56 | 3.27 | 3.03 | 2.51 | 2.77 |
| Tensile Strength, MPa (ASTM D412, 500 mm/min perpendicular to flow) | 7.61 | 7.80 | 7.23 | 6.88 | 4.60 | 5.14 |
| Ultimate Elongation, % (ASTM D412, 500 mm/min perpendicular to flow) | 392 | 388 | 420 | 430 | 377 | 384 |
| Compression Set, 22 hrs, @70° C., % set (ASTM D-395) | 28.1 | 27.9 | 25.4 | 26.3 | 28.5 | 28.3 |
| Compression Set, 70 hrs, @125° C., % set (ASTM D-395) | 44.6 | 39.0 | 40.8 | 41.7 | 51.9 | 53.9 |
| Specific Gravity (ASTM D792) | 0.9555 | 0.9564 | 0.9711 | 0.9545 | 0.9057 | 0.9136 |
| LCR, 1/1200 sec (ASTM D3835) | 77.1 | 79.7 | 78.2 | 79.8 | 53.8 | 49.2 |
| Gravimetric Fogging, DIN 17501 B (mg) | 0.67 | 0.43 | 0.63 | 0.47 | 0.68 | 0.43 |

Having described the various aspects of the compositions herein, further specific embodiments of the invention include those set forth in the following paragraphs.

Embodiment A: A thermoplastic vulcanizate comprising the dynamically vulcanized product of thermoplastic resin, rubber, process oil, and vulcanizing agent, wherein the process oil is selected from extension oil, free oil, curative-in-oil, and combinations thereof, wherein at least a portion of the process oil has, based on the weight of that portion of process oil, (i) an aromatic content of less than 5 wt %; and (ii) a sulfur content of less than 0.03 wt %, and wherein the thermoplastic vulcanizate has a gravimetric fogging, as measured by DIN 17501B, of less than 2 milligrams.

Embodiment B: A thermoplastic vulcanizate comprising thermoplastic resin, an at least partially vulcanized rubber dispersed in the thermoplastic resin, and process oil, wherein the process oil is selected from extension oil, free oil, curative-in-oil, and combinations thereof, wherein at least a portion of the process oil has, based on the weight of that portion of process oil, (i) an aromatic content of less than 5 wt %; and (ii) a sulfur content of less than 0.03 wt %; and wherein the thermoplastic vulcanizate has a gravimetric fogging, as measured by DIN 17501B, of less than 2 milligrams.

Embodiment C: The thermoplastic vulcanizate of Embodiment A or B, wherein the portion of the process oil has an aromatic content of less than 3.5 wt % based on the weight of that portion of the process oil.

Embodiment D: The thermoplastic vulcanizate of any one of Embodiments A to C, wherein the portion of the process oil has an aromatic content of less than 1.5 wt % based on the weight of that portion of the process oil.

Embodiment E: The thermoplastic vulcanizate of any one of Embodiments A to D, wherein the portion of the process oil has a sulfur content of less than 0.003 wt % based on the weight of that portion of the process oil.

Embodiment F: The thermoplastic vulcanizate of any one of Embodiments A to E, wherein the portion of the process oil has a percentage of aromatic carbon, as determined by ASTM D2140, of less than 2%.

Embodiment G: The thermoplastic vulcanizate of any one of Embodiments A to F, wherein the weight ratio of the process oil to the rubber is from 0.5:1 to 2:1.

Embodiment H: The thermoplastic vulcanizate of any one of Embodiments A to G, wherein the thermoplastic vulcanizate is substantially free of process oil that has an aromatic content of greater than 5 wt %.

Embodiment I: The thermoplastic vulcanizate of any one of Embodiments A to H, wherein the thermoplastic vulcanizate is substantially free of process oil that has a sulfur content greater than 0.03 wt %.

Embodiment J: The thermoplastic vulcanizate of any one of Embodiments A to I, having a gravimetric fogging, as measured by DIN 17501B, of less than 1 milligram.

Embodiment K: The thermoplastic vulcanizate of any one of Embodiments A to H, comprising from 5 wt % to 85 wt % of the thermoplastic resin; and from 15 wt % to 95 wt % of the rubber, based on the total weight of the thermoplastic resin and the rubber.

Embodiment L: The thermoplastic vulcanizate of any one of Embodiments A to K, wherein the portion of process oil that has an aromatic content of less than 5 wt % and a sulfur content of less than 0.03 wt % comprises the free oil.

Embodiment M: The thermoplastic vulcanizate of any one of Embodiments A to L, wherein the portion of process oil that has an aromatic content of less than 5 wt % and a sulfur content of less than 0.03 wt % comprises the curative-in-oil.

Embodiment N: The thermoplastic vulcanizate of any one of Embodiments A to M, wherein the portion of process oil that has an aromatic content of less than 5 wt % and a sulfur content of less than 0.03 wt % comprises the extension oil.

Embodiment O: The thermoplastic vulcanizate of any one of Embodiments A to N, wherein the extension oil, curative-in-oil, and free oil, have an aromatic content of less than 5 wt % and a sulfur content of less than 0.03 wt %.

Embodiment P: The thermoplastic vulcanizate of any one of Embodiments A to O, wherein the extension oil or the free oil has at least one of the following properties:
(a) a kinematic viscosity at 40° C. of greater than 75 mm$^2$/sec.; and
(b) a kinematic viscosity at 100° C. of from 8 to 20 mm$^2$/sec.

Embodiment Q: The thermoplastic vulcanizate of any one of Embodiments A to P, wherein the extension oil or the free oil has at least one of the following properties:
(a) a kinematic viscosity at 40° C. of greater than 100 mm$^2$/sec.; and
(b) a kinematic viscosity at 100° C. of from 10 to 16 mm$^2$/sec.

Embodiment R: The thermoplastic vulcanizate of any one of Embodiments A to Q, wherein the curative-in-oil has at least one of the following properties:
(a) a kinematic viscosity at 40° C. of less than 75 mm$^2$/sec.; and
(b) a kinematic viscosity at 100° C. of from less than 8 mm$^2$/sec.

Embodiment S: The thermoplastic vulcanizate of any one of Embodiments A to R, wherein the curative-in-oil has at least one of the following properties:
(a) a kinematic viscosity at 40° C. of less than 50 mm$^2$/sec.; and
(b) a kinematic viscosity at 100° C. of from 3 to 6 mm$^2$/sec.

Embodiment T: The thermoplastic vulcanizate of any one of Embodiments A to S, wherein the curative-in-oil is a phenolic resin-in-oil.

Embodiment U: The thermoplastic vulcanizate of any one of Embodiments A to T, comprising the vulcanizing agent in an amount of 0.1 to 10 parts by weight per 100 parts by weight of the rubber.

Embodiment V: The thermoplastic vulcanizate of any one of Embodiments A to U, wherein the gravimetric fogging is at least 10% lower than a comparative thermoplastic vulcanizate that is identical in terms of the constituents except that the portion of the process oil has an aromatic content of greater than 5 wt % and/or a sulfur content greater than 0.03 wt %.

Embodiment W: The thermoplastic vulcanizate of any one of Embodiments A to V, wherein the gravimetric fogging is at least 30% lower than a comparative thermoplastic vulcanizate that is identical in terms of the constituents except that the at least part of the process oil has an aromatic content of greater than 5 wt % and/or a sulfur content greater than 0.03 wt %.

Embodiment AA: A thermoplastic vulcanizate comprising thermoplastic resin, an at least partially vulcanized rubber dispersed in the thermoplastic resin, and process oil; wherein the process oil comprises extension oil, free oil, and curative-in-oil; wherein the free oil has, based on the weight of the free oil, (i) an aromatic content of less than 5 wt %; and (ii) a sulfur content of less than 0.03 wt %; and wherein the weight ratio of the process oil to the rubber is from 0.5:1 to 2:1.

Embodiment AB: A thermoplastic vulcanizate comprising the dynamically vulcanized product of thermoplastic resin, rubber, process oil, and vulcanizing agent, wherein the process oil comprises extension oil, free oil, and curative-in-oil, wherein the free oil has, based on the weight of the free oil, (i) an aromatic content of less than 5 wt %; and (ii) a sulfur content of less than 0.03 wt %; and wherein the weight ratio of the process oil to the rubber is from 0.5:1 to 2:1.

Embodiment AC: The thermoplastic vulcanizate of Embodiment AA or Embodiment AB, wherein the thermoplastic vulcanizate has a gravimetric fogging, as measured by DIN 17501B, of less than 2 milligram.

Embodiment AD: The thermoplastic vulcanizate of Embodiment AA or Embodiment AB, wherein the thermoplastic vulcanizate has a gravimetric fogging, as measured by DIN 17501B, of less than 1 milligram.

Embodiment AE: The thermoplastic vulcanizate of any one of Embodiments AA to AD, wherein the oil in the free oil has a percentage of aromatic carbon, as determined by ASTM D2140, of less than 2%.

Embodiment AF: The thermoplastic vulcanizate of any one of Embodiments AA to AE, wherein the curative-in-oil has, based on the weight of the curative-in-oil, (i) an aromatic content of less than 5 wt %; and (ii) a sulfur content of less than 0.03 wt %.

Embodiment AG: The thermoplastic vulcanizate of any one of Embodiments AA to AF, wherein the extension oil has, based on the weight of the extension oil, (i) an aromatic content of less than 5 wt %; and (ii) a sulfur content of less than 0.03 wt %.

Embodiment AH: The thermoplastic vulcanizate of any one of Embodiments AA to AG, wherein at least one of the extension oil, free oil, or combinations thereof, has at least one of the following properties:
(a) a kinematic viscosity at 40° C. of greater than 100 mm$^2$/sec.;
(b) a kinematic viscosity at 100° C. of from 10 to 16 mm$^2$/sec.

Embodiment AI: The thermoplastic vulcanizate of any one of Embodiments AA to AG, wherein the curative-in-oil, have at least one of the following properties:
(a) a kinematic viscosity at 40° C. of greater than 50 mm$^2$/sec.;
(b) a kinematic viscosity at 100° C. of from 3 to 6 mm$^2$/sec.

Embodiment AJ: The thermoplastic vulcanizate of any one of Embodiments AA to AI, wherein the thermoplastic vulcanizate has a gravimetric fogging, as measured by DIN 17501B, at least 30% lower than a comparative thermoplastic vulcanizate composition that is identical in terms of the constituents except that the curative-in-oil has an aromatic content of greater than 5 wt % and/or a sulfur content greater than 0.03 wt %.

Embodiment BA: A method for making a thermoplastic vulcanizate composition, the method comprising the steps of: (a) providing thermoplastic resin, rubber, vulcanizing agent, and process oil, the process oil selected from extension oil, free oil, curative-in-oil, and combinations thereof; (b) dynamically vulcanizing the rubber in the presence of the thermoplastic resin, vulcanizing agent, and at least a portion of the process oil, wherein at least the portion of the process oil has, based on the weight of the portion of the process oil, (i) an aromatic content of less than 5 wt %; and (ii) a sulfur content of less than 0.03 wt %.

Embodiment BB: The method of Embodiment BA, wherein the process oil and the rubber are added by a weight ratio of from 0.5:1 to 2:1.

Embodiment BC: The method of Embodiment BA or BB, wherein the vulcanizing agent comprises a phenolic resin.

Embodiment BD: The method of any one of Embodiments BA to BC, wherein the phenolic resin is added as part of a curative-in-oil.

Embodiment BE: The method of any one of Embodiments BA to BD, wherein the rubber is vulcanized without the presence of a process oil having an aromatic content of greater than 5 wt % and/or sulfur content greater than 0.03 wt %.

Embodiment BF: The method of any one of Embodiments BA to BE, wherein the thermoplastic vulcanizate has a gravimetric fogging, as measured by DIN 17501B, of less than 2 milligrams.

Embodiment BG: The method of any one of Embodiments BA to BF, wherein the thermoplastic vulcanizates have a gravimetric fogging, as measured by DIN 17501B, of less than 1 milligram.

Embodiment BH: The method of any one of Embodiments BA to BG, wherein the gravimetric fogging, as measured by DIN 17501B, is at least 10% lower than a comparative thermoplastic vulcanizate that is made from a composition which is identical in terms of the constituents except that the portion of the process oil has an aromatic content of greater than 5 wt % and/or a sulfur content greater than 0.03 wt %.

Embodiment BI: A thermoplastic vulcanizate made from the composition of any one of Embodiments BA to BH.

Embodiment BJ: An article comprising at least one part made of the thermoplastic vulcanizate of any one of Embodiments A to Q or Embodiments AA to AJ or Embodiment BI.

Embodiment BK: A method of improving the fogging property of a thermoplastic vulcanizate, the method comprising dynamically vulcanizing rubber in the presence of thermoplastic resin, a phenolic resin, and process oil, wherein the process oil comprises extension oil, free oil, and curative-in-oil, wherein the curative-in-oil has, based on the weight of the curative-in-oil, (i) an aromatic content of less than 5 wt %; and (ii) a sulfur content of less than 0.03 wt %; and wherein the gravimetric fogging, as measured by DIN 17501B, is at least 10% lower than a comparative thermoplastic vulcanizate that is made from a composition which is identical in terms of the constituents except that the curative-in-oil has an aromatic content of greater than 5 wt % and/or a sulfur content greater than 0.03 wt %.

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A thermoplastic vulcanizate comprising the dynamically vulcanized product of thermoplastic resin, rubber, process oil, and vulcanizing agent, wherein the vulcanizing agent comprises a phenolic resin,
    wherein the process oil is selected from extension oil, free oil, phenolic resin-in-oil, and combinations thereof,
    wherein all of the process oil has, based on the weight of the process oil,
        (i) an aromatic content of less than 5 wt %, and
        (ii) a sulfur content of less than 0.03 wt %, and
    wherein the process oil includes the phenolic resin-in-oil,
        wherein the process oil in the phenolic resin-in-oil has an aromatic concentration of less than 1.5 wt % and a sulfur content of less than 0.03 wt %; and
    wherein the thermoplastic vulcanizate has a gravimetric fogging, as measured by DIN 17501B, of less than 1 milligrams.

2. The thermoplastic vulcanizate of claim 1, wherein the process oil has an aromatic content of less than 3.5 wt % based on the weight of the process oil.

3. The thermoplastic vulcanizate of claim 1, wherein the process oil has a sulfur content of less than 0.003 wt % based on the weight of the process oil.

4. The thermoplastic vulcanizate of claim 1, wherein the process oil has a percentage of aromatic carbon, as determined by ASTM D2140, of less than 2%.

5. The thermoplastic vulcanizate of claim 1, wherein the weight ratio of process oil to rubber is from 0.5:1 to 2:1.

6. The thermoplastic vulcanizate of claim 1, wherein the thermoplastic vulcanizate comprises from 5 wt % to 85 wt % of the thermoplastic resin; and from 15 wt % to 95 wt % of the rubber, based on the total weight of the thermoplastic resin and the rubber.

7. The thermoplastic vulcanizate of claim 1, wherein the phenolic resin-in-oil comprises vulcanizing agent in an amount of 0.1 to 10 parts by weight per 100 parts by weight of the rubber.

8. The thermoplastic vulcanizate of claim 1, wherein the gravimetric fogging of the thermoplastic vulcanizate is at least 10% lower than a comparative thermoplastic vulcanizate that is identical in terms of the constituents except that at least a portion of the process oil of the comparative thermoplastic vulcanizate has an aromatic content of greater than 5 wt % and / or a sulfur content greater than 0.03 wt %.

9. A thermoplastic vulcanizate comprising thermoplastic resin, an at least partially vulcanized rubber dispersed in the thermoplastic resin, and process oil,
    wherein the process oil comprises extension oil, free oil, and phenolic resin-in-oil,
    wherein all of the process oil has, based on the weight of the process oil,
        (i) an aromatic content of less than 5 wt %, and
        (ii) a sulfur content of less than 0.03 wt %,
    wherein the process oil includes the phenolic resin-in-oil,
        wherein the process oil in the phenolic resin-in-oil has an aromatic concentration of less than 1.5 wt % and a sulfur content of less than 0.03 wt %; and
    and wherein the weight ratio of process oil to the rubber is from 0.5:1 to 2:1.

10. The thermoplastic vulcanizate of claim 9, wherein the thermoplastic vulcanizate has a gravimetric fogging, as measured by DIN 17501B, of less than 1 milligram.

11. The thermoplastic vulcanizate of claim 9, wherein the oil in the curative-in-oil has a percentage of aromatic carbon, as determined by ASTM D2140, of less than 2%.

12. A method for making a thermoplastic vulcanizate composition, the method comprising the steps of:
    (a) providing thermoplastic resin, rubber, a vulcanizing agent, and process oil, wherein the vulcanizing agent comprises a phenolic resin, the process oil being selected from extension oil, free oil, a phenolic resin-in-oil, and combinations thereof;
    (b) dynamically vulcanizing the rubber with the vulcanizing agent in the presence of the thermoplastic resin and at least a portion of the process oil,
    wherein the process oil contains, based on the weight of the process oil,
        (i) an aromatic content of less than 5 wt %, and
        (ii) a sulfur content of less than 0.03 wt %; and wherein the process oil includes the phenolic resin-in-oil, wherein the process oil in the phenolic resin-in-oil has an aromatic concentration of less than 1.5 wt % and a sulfur content of less than 0.03 wt %.

13. The method of claim 12, wherein the weight ratio of the process oil to the rubber is from 0.5:1 to 2:1.

14. The method of claim 12, wherein the thermoplastic vulcanizate has a gravimetric fogging, as measured by DIN 17501B, of less than 2 milligrams.

15. An article comprising a part made of the thermoplastic vulcanizate of claim 1.

16. A method of improving fogging property of a thermoplastic vulcanizate, the method comprising dynamically vulcanizing rubber in the presence of thermoplastic resin and process oil,
- wherein the process oil comprises extension oil, free oil, and phenolic resin-in-oil,
- wherein the phenolic resin-in-oil has, based on the weight of the phenolic resin-in-oil, has
  - (i) an aromatic content of less than 5 wt %; and
  - (ii) a sulfur content of less than 0.03 wt %,
- wherein the gravimetric fogging of the thermoplastic vulcanizate, as measured by DIN 17501B, is at least 10% lower than that of a comparative thermoplastic vulcanizate that is made from a composition which is identical in terms of the constituents except that the phenolic resin-in-oil has an aromatic content of greater than 1.5 wt % and/or a sulfur content greater than 0.03 wt %.

* * * * *